(12) United States Patent
Duan et al.

(10) Patent No.: US 12,175,807 B2
(45) Date of Patent: Dec. 24, 2024

(54) COMMERCIAL ELECTRIC VEHICLE ENERGY CONSUMPTION PREDICTION METHOD AND APPARATUS, AND COMPUTER DEVICE

(71) Applicant: CONTEMPORARY AMPEREX TECHNOLOGY (HONG KONG) LIMITED, Hong Kong (CN)

(72) Inventors: Panting Duan, Ningde (CN); Wei Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 182 days.

(21) Appl. No.: 17/929,889

(22) Filed: Sep. 6, 2022

(65) Prior Publication Data

US 2023/0222852 A1    Jul. 13, 2023

Related U.S. Application Data

(63) Continuation of application No. PCT/CN2022/096746, filed on Jun. 2, 2022.

(30) Foreign Application Priority Data

Jan. 7, 2022    (CN) .......................... 202210016220.8

(51) Int. Cl.
*B60L 58/16*    (2019.01)
*G06N 5/022*    (2023.01)
(Continued)

(52) U.S. Cl.
CPC ................ *G07C 5/04* (2013.01); *B60L 58/16* (2019.02); *G06N 5/022* (2013.01); *H01M 10/48* (2013.01); *H01M 2220/20* (2013.01)

(58) Field of Classification Search
CPC ........... G07C 5/04; B60L 58/16; G06N 5/022; H01M 10/48; H01M 2220/20
See application file for complete search history.

(56) References Cited

U.S. PATENT DOCUMENTS

| 2013/0079962 A1 | 3/2013 | Ishikawa et al. |
| 2014/0046595 A1 | 2/2014 | Segawa et al. |
| | (Continued) | |

FOREIGN PATENT DOCUMENTS

| CN | 104331743 A | 2/2015 |
| CN | 105904981 A | 8/2016 |
| | (Continued) | |

OTHER PUBLICATIONS

Extended European Search Report for EP application No. 22746939. 2, dated Dec. 20, 2023.
(Continued)

*Primary Examiner* — Mathew Franklin Gordon
(74) *Attorney, Agent, or Firm* — Ladas & Parry LLP

(57) ABSTRACT

The present application relates to an electric vehicle energy consumption prediction method and apparatus, a computer device, a computer-readable storage medium, and a computer program product. The method includes: acquiring discharge duration data of an electric vehicle; acquiring driving position characteristic data of the electric vehicle; and inputting the discharge duration data and the driving position characteristic data into an energy consumption prediction model to obtain energy consumption prediction data of the electric vehicle. The energy consumption prediction model is obtained based on a machine learning algorithm.

18 Claims, 7 Drawing Sheets

(51) Int. Cl.
*G07C 5/04* (2006.01)
*H01M 10/48* (2006.01)

(56) References Cited

U.S. PATENT DOCUMENTS

| | | |
|---|---|---|
| 2014/0088781 A1 | 3/2014 | Kearns et al. |
| 2014/0200756 A1 | 7/2014 | Sisk |
| 2015/0310461 A1 | 10/2015 | Lee et al. |
| 2016/0040995 A1 | 2/2016 | Kano et al. |
| 2017/0038222 A1 | 2/2017 | Meyer et al. |
| 2018/0118033 A1 | 5/2018 | Lu et al. |

FOREIGN PATENT DOCUMENTS

| | | |
|---|---|---|
| CN | 106515478 A | 3/2017 |
| CN | 106600080 A | 4/2017 |
| CN | 109367433 A | 2/2019 |
| CN | 109740213 A | 5/2019 |
| CN | 110222906 A | 9/2019 |
| CN | 110435429 A | 11/2019 |
| CN | 111452794 A | 7/2020 |
| CN | 111666715 A | 9/2020 |
| CN | 111832881 A | 10/2020 |
| CN | 112078431 A | 12/2020 |
| CN | 112560186 A | 3/2021 |
| CN | 113340315 A | 9/2021 |
| CN | 113428159 A | 9/2021 |
| JP | 2020012695 A | 1/2020 |
| JP | 2022129116 A | 9/2022 |
| WO | 2014049878 A1 | 4/2014 |
| WO | 2014192615 A1 | 12/2014 |
| WO | 2015163732 A1 | 10/2015 |
| WO | 2020253204 A1 | 12/2020 |
| WO | 2021044134 A1 | 3/2021 |
| WO | 2021244632 A1 | 12/2021 |

OTHER PUBLICATIONS

Notification to Grant Patent Right for CN application No. 202210016220.8, dated Aug. 4, 2023.
International Search Report for International Application PCT/CN2022/096746 dated Sep. 28, 2022.
Written Opinion of International Search Authority for International Application PCT/CN2022/096746 dated Sep. 28, 2022.
First search of priority application CN2022100162208 dated Jun. 7, 2023.
First office action of priority application of CN2022100162208 dated Jun. 9, 2023.
Supplementary search of priority application CN2022100162208 dated Aug. 1, 2023.
Anastasia Bolovinou, et al., Online Prediction of an Electric Vehicle Remaining Range based on Regression Analysis, Research Gate, Dec. 2014, 9 pages.
Liu Guangming, Prediction of battery remaining discharge energy oriented for remaining driving range estimation of electric vehicles, Apr. 2015.
Research on Economic Cruise Control Strategy of Pure Electric Vehicle based on Target Mileage, Jun. 3, 2018, 76 pages.
Notice of Reasons for Refusal, JP application No. 2022-548244, dated Mar. 5, 2024.
Decision to Grant a Patent, JP application No. 2022-548244, dated Jul. 23, 2024.

COMMERCIAL ELECTRIC VEHICLE ENERGY CONSUMPTION PREDICTION METHOD AND APPARATUS, AND COMPUTER DEVICE

CROSS-REFERENCE TO RELATED APPLICATIONS

This application is a continuation of International Patent Application No. PCT/CN2022/096746, filed on Jun. 2, 2022, which claims priority to Chinese Patent Application No. 202210016220.8, filed on Jan. 7, 2022. The aforementioned patent applications are incorporated herein by reference in their entirety.

TECHNICAL FIELD

The present application relates to the technical field of motor control, and in particular, to a commercial electric vehicle energy consumption prediction method and apparatus, a computer device, a computer-readable storage medium, and a computer program product.

BACKGROUND

With the aggravation of energy and environmental problems and the development of vehicle battery technologies, commercial electric vehicles have been more and more widely used. An energy consumption level of a commercial electric vehicle directly reflects an overall performance level of the commercial electric vehicle, and affects key indicators such as a driving range, quality assurance evaluation, and economic benefits of the commercial electric vehicle. Therefore, there is a need to predict energy consumption of the commercial electric vehicle.

In a commercial electric vehicle energy consumption prediction method under some circumstances, vehicle energy consumption is predicted under a fixed operating condition such as a New European Driving Cycle (NEDC) simulated vehicle operating condition and based on a vehicle dynamics model in combination with vehicle characteristic parameters such as a vehicle frontal area, mass, and a coefficient of rolling resistance. Since it is difficult to accurately acquire the above vehicle characteristic parameters during actual application of the vehicle, a conventional commercial electric vehicle energy consumption prediction method is limited to a simulated operating condition of a laboratory simulation environment, and has the disadvantage of poor accuracy of a prediction result.

SUMMARY

According to various embodiments of the present application, a commercial electric vehicle energy consumption prediction method and apparatus, a computer device, a computer-readable storage medium, and a computer program product are provided, so as to improve accuracy of an energy consumption prediction result of a commercial electric vehicle.

A commercial electric vehicle energy consumption prediction method, including:

acquiring discharge duration data of a commercial electric vehicle; acquiring driving position characteristic data of the commercial electric vehicle; and substituting the discharge duration data and the driving position characteristic data into an energy consumption prediction model to obtain energy consumption prediction data of the commercial electric vehicle; the energy consumption prediction model being obtained based on a machine learning algorithm.

According to the above commercial electric vehicle energy consumption prediction method, the discharge duration data and the driving position characteristic data are substituted into the energy consumption prediction model to obtain the energy consumption prediction data. Since a driving route of the commercial electric vehicle is relatively fixed, driving position characteristic data corresponding to the driving route can reflect an actual driving environment of the commercial electric vehicle to some extent, which is beneficial to improve accuracy of the energy consumption prediction data.

In some examples, prior to the substituting the discharge duration data and the driving position characteristic data into an energy consumption prediction model to obtain energy consumption prediction data of the commercial electric vehicle, the method further includes: performing, according to historical driving data and rated battery capacity of the commercial electric vehicle and a preset model loss function, model training based on the machine learning algorithm to obtain the energy consumption prediction model.

In the above examples, model training is performed based on the historical driving data of the commercial electric vehicle to obtain the energy consumption prediction model before the discharge duration data and the driving position characteristic data are substituted into the energy consumption prediction model to obtain the energy consumption prediction data of the commercial electric vehicle, which is beneficial to improve scientificity of the commercial electric vehicle energy consumption prediction method.

In some examples, the performing, according to historical driving data and rated battery capacity of the commercial electric vehicle and a preset model loss function, model training based on the machine learning algorithm to obtain the energy consumption prediction model includes: acquiring the historical driving data and the rated battery capacity of the commercial electric vehicle; the historical driving data including historical charge and discharge data and historical driving position characteristic data; calculating historical energy consumption data per unit time of the commercial electric vehicle based on the historical charge and discharge data and the rated battery capacity; obtaining historical energy consumption data according to the historical energy consumption data per unit time and the historical driving position characteristic data; and performing, according to the historical energy consumption data and the preset model loss function, model training based on the machine learning algorithm to obtain the energy consumption prediction model.

In the above examples, in the process of model training, the historical energy consumption data per unit time of the commercial electric vehicle is calculated first, and then model training is performed based on the historical energy consumption data per unit time and the historical driving position characteristic data to obtain the energy consumption prediction model, so that a relationship between energy consumption per unit time and driving position characteristics can be accurately represented, which is beneficial to improve a degree of matching between the energy consumption prediction model and an actual operating condition, thereby improving prediction accuracy of the model.

In some examples, the acquiring the historical driving data of the commercial electric vehicle includes: acquiring historical raw driving data of the commercial electric vehicle; and pre-processing the historical raw driving data to obtain the historical driving data of the commercial electric vehicle.

In the above examples, after the historical raw driving data of the commercial electric vehicle is acquired, the historical driving data can be obtained only by pre-processing the historical raw driving data, so as to prevent occurrence of repeated or incomplete historical driving data, which can effectively improve the prediction accuracy and prediction efficiency of the model.

In some examples, the calculating historical energy consumption data per unit time of the commercial electric vehicle based on the historical charge and discharge data and the rated battery capacity includes: obtaining historical charge data and historical discharge data of the commercial electric vehicle based on the historical charge and discharge data by taking a set time as a cycle; obtaining a battery state of health of the commercial electric vehicle within the set time based on the historical charge data and the rated battery capacity; and obtaining the historical energy consumption data per unit time of the commercial electric vehicle according to the battery state of health, the rated battery capacity, and historical discharge data corresponding to the historical charge data.

In the above examples, in the process of calculating the historical energy consumption data per unit time of the commercial electric vehicle, the consideration of a real-time battery state of health of the vehicle helps improve the accuracy of the historical energy consumption data per unit time, thereby improving the prediction accuracy of the model.

In some examples, one charge section corresponds to a plurality of sub-discharge sections within the preset time; and the obtaining the historical energy consumption data per unit time of the commercial electric vehicle according to the battery state of health, the rated battery capacity, and historical discharge data corresponding to the historical charge data includes: obtaining the historical energy consumption data per unit time of the commercial electric vehicle according to the battery state of health, the rated battery capacity, and historical discharge data of the sub-discharge sections.

In the above examples, when the historical energy consumption data per unit time is analyzed, in view of a case that one charge section corresponds to a plurality of sub-discharge sections within the set time, final analysis on the historical energy consumption data per unit time can be realized in combination with the historical discharge data of the sub-discharge sections, so as to effectively improve the reliability of the analysis on the historical energy consumption data per unit time.

In some examples, a plurality of charge sections exist within the set time; and the obtaining the historical energy consumption data per unit time of the commercial electric vehicle according to the battery state of health, the rated battery capacity, and historical discharge data corresponding to the historical charge data includes: obtaining the historical energy consumption data per unit time of the commercial electric vehicle according to the battery state of health, the rated battery capacity, historical charge data of the charge sections, and historical discharge data of discharge sections corresponding to the charge sections.

In the above examples, when the historical energy consumption data per unit time is analyzed, in view of a case that a plurality of charge sections exist within the set time, energy consumption of the discharge sections can be calculated respectively in combination with the historical discharge data of the discharge sections corresponding to the charge sections to finally realize the analysis on the historical energy consumption data per unit time, which can further improve the reliability of the analysis on the historical energy consumption data per unit time.

In some examples, the obtaining the historical energy consumption data per unit time of the commercial electric vehicle according to the battery state of health, the rated battery capacity, historical charge data of the charge sections, and historical discharge data of discharge sections corresponding to the charge sections includes: obtaining energy consumption of the discharge sections corresponding to the charge sections according to the battery state of health, the rated battery capacity, the historical charge data of the charge sections, and the historical discharge data of the discharge sections corresponding to the charge sections; calculating, if a maximum energy consumption value in the energy consumption of the discharge sections corresponding to the charge sections is less than the rated battery capacity, historical energy consumption data per unit time within the set time according to the maximum energy consumption value; calculating, if the maximum energy consumption value in the energy consumption of the discharge sections corresponding to the charge sections is greater than or equal to the rated battery capacity and less than a preset multiple of the rated battery capacity, the historical energy consumption data per unit time within the set time according to an average value of the energy consumption of the discharge sections corresponding to the charge sections; and discarding, if the maximum energy consumption value in the energy consumption of the discharge sections corresponding to the charge sections is greater than or equal to the preset multiple of the rated battery capacity, the historical charge and discharge data within the corresponding set time.

In the above examples, different processing is performed according to the energy consumption of the discharge sections corresponding to the charge sections, different historical energy consumption data per unit time is analyzed in combination with different intervals thereof, and under abnormal circumstances, historical charge and discharge data within a corresponding cycle can be discarded, which effectively improves the accuracy of the analysis on the historical energy consumption data per unit time.

In some examples, after the substituting the discharge duration data and the driving position characteristic data into an energy consumption prediction model to obtain energy consumption prediction data of the commercial electric vehicle, the method further includes: dividing the historical energy consumption data into a training set and a test set, and obtaining energy consumption prediction data corresponding to the test set based on the training set and the energy consumption prediction model; and correcting the energy consumption prediction data according to the test set and the energy consumption prediction data corresponding to the test set, to obtain corrected energy consumption prediction data.

In the above examples, after the energy consumption prediction data is obtained, the energy consumption prediction result is further corrected based on the training set and the test set, which can further improve the prediction accuracy of the commercial electric vehicle energy consumption prediction method.

In some examples, the substituting the discharge duration data and the driving position characteristic data into an energy consumption prediction model includes: interpolating the discharge duration data to obtain interpolated discharge duration data, and substituting the interpolated discharge duration data and the driving position characteristic data into the energy consumption prediction model.

In the above examples, the discharge duration data is interpolated before being substituted into the energy consumption prediction model, which can ensure continuity of the discharge duration data inputted to the model and then ensure continuity of the energy consumption prediction data, being beneficial to improve flexibility of the commercial electric vehicle energy consumption prediction method.

In some examples, the substituting the discharge duration data and the driving position characteristic data into an energy consumption prediction model to obtain energy consumption prediction data of the commercial electric vehicle includes: substituting the discharge duration data and the driving position characteristic data into the energy consumption prediction model to obtain initial energy consumption prediction data of the commercial electric vehicle; and dividing the initial energy consumption prediction data into groups according to the preset time, and taking preset centiles of the groups as energy consumption prediction data within the corresponding preset time; the preset centiles being greater than 50%.

In the above examples, the initial energy consumption prediction data predicted by the energy consumption prediction model is divided into groups and then a large preset centile of the groups is taken as the energy consumption prediction data, which can eliminate the interference of noise values and improve the accuracy of the energy consumption prediction data.

In some examples, after the substituting the discharge duration data and the driving position characteristic data into an energy consumption prediction model to obtain energy consumption prediction data of the commercial electric vehicle, the method further includes: acquiring a battery state of health estimated value of the commercial electric vehicle, and determining a breakdown risk of the commercial electric vehicle according to the battery state of health estimated value and the energy consumption prediction data.

In the above examples, after the energy consumption prediction data of the commercial electric vehicle is obtained, the battery state of health estimated value of the commercial electric vehicle is further acquired, and the breakdown risk of the commercial electric vehicle is determined according to the battery state of health estimated value and the energy consumption prediction data, which can facilitate a user to find an anomaly in time and take a corresponding measure, is conducive to reducing the probability of breakdown of the commercial electric vehicle, and improves safety of use of the vehicle.

A commercial electric vehicle energy consumption prediction apparatus, including:

a discharge duration acquisition module configured to acquire discharge duration data of a commercial electric vehicle; a driving position characteristic acquisition module configured to acquire driving position characteristic data of the commercial electric vehicle; and an energy consumption prediction module configured to substitute the discharge duration data and the driving position characteristic data into an energy consumption prediction model to obtain energy consumption prediction data of the commercial electric vehicle; the energy consumption prediction model being obtained based on a machine learning algorithm.

According to the above commercial electric vehicle energy consumption prediction apparatus, the discharge duration data and the driving position characteristic data are substituted into the energy consumption prediction model to obtain the energy consumption prediction data. Since a driving route of the commercial electric vehicle is relatively fixed, driving position characteristic data corresponding to the driving route can reflect an actual driving environment of the commercial electric vehicle to some extent, which is beneficial to improve accuracy of the energy consumption prediction data.

In some examples, the commercial electric vehicle energy consumption prediction apparatus further includes: an energy consumption prediction model training module configured to perform, according to historical driving data and rated battery capacity of the commercial electric vehicle and a preset model loss function, model training based on the machine learning algorithm to obtain the energy consumption prediction model.

In the above examples, model training is performed based on the historical driving data of the commercial electric vehicle to obtain the energy consumption prediction model before the discharge duration data and the driving position characteristic data are substituted into the energy consumption prediction model to obtain the energy consumption prediction data of the commercial electric vehicle, which is beneficial to improve scientificity of the commercial electric vehicle energy consumption prediction method.

In some examples, the energy consumption prediction model training module includes: a data acquisition unit configured to acquire the historical driving data and the rated battery capacity of the commercial electric vehicle; the historical driving data including historical charge and discharge data and historical driving position characteristic data; an energy consumption data calculation unit configured to calculate historical energy consumption data per unit time of the commercial electric vehicle based on the historical charge and discharge data and the rated battery capacity; a historical energy consumption data generation unit configured to obtain historical energy consumption data according to the historical energy consumption data per unit time and the historical driving position characteristic data; and an energy consumption prediction model training unit configured to perform, according to the historical energy consumption data and the preset model loss function, model training based on the machine learning algorithm to obtain the energy consumption prediction model.

In the above examples, in the process of model training, the historical energy consumption data per unit time of the commercial electric vehicle is calculated first, and then model training is performed based on the historical energy consumption data per unit time and the historical driving position characteristic data to obtain the energy consumption prediction model, so that a relationship between energy consumption per unit time and driving position characteristics can be accurately represented, which is beneficial to improve a degree of matching between the energy consumption prediction model and an actual operating condition, thereby improving prediction accuracy of the model.

In some examples, the commercial electric vehicle energy consumption prediction apparatus further includes: a correction module configured to divide the historical energy consumption data into a training set and a test set, and obtain energy consumption prediction data corresponding to the test set based on the training set and the energy consumption prediction model; and correct the energy consumption prediction data according to the test set and the energy consumption prediction data corresponding to the test set, to obtain corrected energy consumption prediction data.

In the above examples, after the energy consumption prediction data is obtained, the energy consumption prediction result is further corrected based on the training set and the test set, which can further improve the prediction accuracy of the commercial electric vehicle energy consumption prediction method.

In some examples, the commercial electric vehicle energy consumption prediction apparatus further includes: a breakdown risk determination module configured to acquire a battery state of health estimated value of the commercial electric vehicle, and determine a breakdown risk of the commercial electric vehicle according to the battery state of health estimated value and the energy consumption prediction data.

In the above examples, after the energy consumption prediction data of the commercial electric vehicle is obtained, the battery state of health estimated value of the commercial electric vehicle is further acquired, and the breakdown risk of the commercial electric vehicle is determined according to the battery state of health estimated value and the energy consumption prediction data, which can facilitate a user to find an anomaly in time and take a corresponding measure, is conducive to reducing the probability of breakdown of the commercial electric vehicle, and improves safety of use of the vehicle.

A computer device, including a memory and one or more processors, the memory storing computer-readable instructions which, when executed by the one or more processors, cause the one or more processors to perform the following steps:

acquiring discharge duration data of a commercial electric vehicle; acquiring driving position characteristic data of the commercial electric vehicle; and substituting the discharge duration data and the driving position characteristic data into an energy consumption prediction model to obtain energy consumption prediction data of the commercial electric vehicle; the energy consumption prediction model being obtained based on a machine learning algorithm.

One or more non-volatile computer-readable storage media storing computer-readable instructions which, when executed by one or more processors, cause one or more processors to perform the following steps:

acquiring discharge duration data of a commercial electric vehicle; acquiring driving position characteristic data of the commercial electric vehicle; and substituting the discharge duration data and the driving position characteristic data into an energy consumption prediction model to obtain energy consumption prediction data of the commercial electric vehicle; the energy consumption prediction model being obtained based on a machine learning algorithm.

A computer program product, including a computer program which, when executed by one or more processors, causes the one or more processors to perform the following steps:

acquiring discharge duration data of a commercial electric vehicle; acquiring driving position characteristic data of the commercial electric vehicle; and substituting the discharge duration data and the driving position characteristic data into an energy consumption prediction model to obtain energy consumption prediction data of the commercial electric vehicle; the energy consumption prediction model being obtained based on a machine learning algorithm.

According to the computer device, the computer-readable storage medium, and the computer program product, the discharge duration data and the driving position characteristic data are substituted into the energy consumption prediction model to obtain the energy consumption prediction data. Since a driving route of the commercial electric vehicle is relatively fixed, driving position characteristic data corresponding to the driving route can reflect an actual driving environment of the commercial electric vehicle to some extent, which is beneficial to improve accuracy of the energy consumption prediction data.

BRIEF DESCRIPTION OF DRAWINGS

In order to illustrate the technical solutions in the examples of the present application more clearly, the drawings to be used in the examples of the present application will be briefly introduced below. Obviously, the drawings described below are only some examples of the present application. For those of ordinary skill in the art, other drawings can also be obtained according to the drawings without any creative effort.

DETAILED DESCRIPTION

In order to make the technical solutions and advantages of the present application clearer, the present application will be described in further detail below in conjunction with the accompanying drawings and examples. It should be understood that specific examples described herein are intended only to explain the present application, but not to limit the present application.

Unless otherwise defined, all technical and scientific terms used herein have the same meaning as commonly understood by those skilled in the art to which the present application belongs. The terms used herein are for the purpose of describing specific examples only, and are not intended to limit the present application. The terms "include/comprise" and "have" and any variations thereof in the specification and claims of the present application as well as in the above description of drawings are intended to cover a non-exclusive inclusion.

In the description of the examples of the present application, the technical terms "first", "second", and the like are intended only to distinguish different objects, and are not to be understood as indicating or implying a relative importance or implicitly specifying a number, a particular order, or a primary and secondary relation of the technical features indicated. In the description of the examples of the present application, the meaning of "a plurality of" is two or more, unless otherwise explicitly and specifically defined. Also, as used in this specification, the term "and/or" includes any and all combinations of the associated listed items.

The commercial electric vehicle energy consumption prediction method and apparatus, the computer device, the computer-readable storage medium, and the computer program product according to the present application can be applied to various commercial electric vehicles, including, but not limited to, electric buses, subway electric vehicles, railway line electric vehicles, light rail electric vehicles, and the like.

Figure 1:
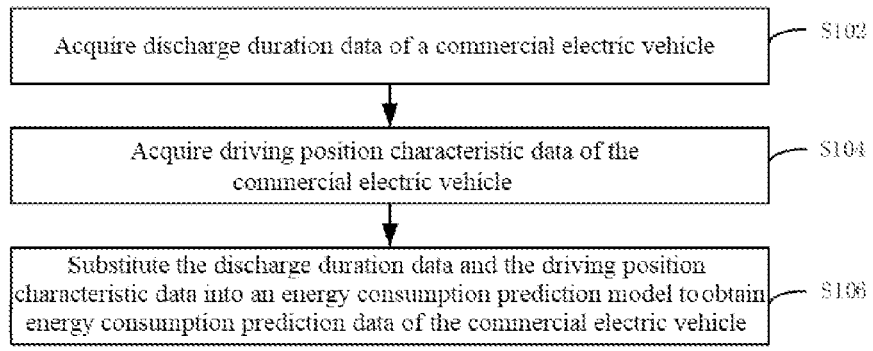
FIG. 1 is a schematic flow chart of a commercial electric vehicle energy consumption prediction method according to some examples of the present application.

In a first aspect, the present application provides a commercial electric vehicle energy consumption prediction method. The method may be applied to a terminal or a server, and may also be implemented through interaction between the terminal and the server. For ease of understanding, the following description is given with an example in which the method is applied to a terminal. In some examples, as shown in FIG. 1, the method includes step S102 to step S106.

In step S102, discharge duration data of a commercial electric vehicle is acquired.

The discharge duration data refers to a data set composed of discharge durations in each calculation cycle of the commercial electric vehicle by taking a set time as a calculation cycle. The set time may be half a day, one day or two days. Specifically, the discharge duration data may be extracted from charge and discharge data of the commercial electric vehicle. The charge and discharge data includes charge and discharge start times and end times, charged capacity, a State of Charge (SOC, a percentage of the amount of available remaining charges in a battery) corresponding to each time, and the like. A discharge duration is a time difference between the discharge start time and the discharge end time.

Further, the terminal may acquire charge and discharge data of the commercial electric vehicle, and perform data pre-processing on the charge and discharge data to obtain the discharge duration data. For example, the terminal may remove data rows with repeated and incomplete data information in the charge and discharge data, extract discharge data of the commercial electric vehicle in discharge sections according to field information, and then calculate a discharge duration based on a discharge start time and a discharge end time in the discharge data. The terminal may also eliminate abnormal values in the calculated discharge duration based on statistical rules, so as to prevent the influence of abnormal data and further improve the accuracy of energy consumption prediction. For example, the discharge duration data of $<-1*sigma$ and $>+3*sigma$ in a plurality of calculation cycles within a preset duration may be eliminated.

It should be noted that, if a plurality of sub-discharge sections exist within the set time, the sub-discharge durations of the sub-discharge sections are added to calculate a discharge duration within the set time.

In step S104, driving position characteristic data of the commercial electric vehicle is acquired.

Step S104 may be performed prior to or after step S102 or synchronously with step S102. Further, the driving position characteristic data includes driving positions of the commercial electric vehicle at different times, weather data and terrain data corresponding to the driving positions, and the like. The weather data includes information such as an air temperature, humidity, an air pressure, and a wind speed. The terrain data includes information such as slope, track resistance, and air resistance.

Specifically, since a driving route of the commercial electric vehicle is relatively fixed, the terminal can acquire driving position characteristic data in the same historical period, or first acquire a driving route of the commercial electric vehicle within a time to be predicted, and then correlate the weather data and the terrain data corresponding to the driving positions according to driving position information of the vehicle on the driving route, to obtain driving position characteristic data corresponding to the driving route. for example, weather data in the same historical period corresponding to the driving route, and terrain data corresponding to the driving route.

Further, the terminal may specifically acquire the discharge duration data and the driving position characteristic data of the commercial electric vehicle actively or passively.

In step S106, the discharge duration data and the driving position characteristic data are substituted into an energy consumption prediction model to obtain energy consumption prediction data of the commercial electric vehicle.

The energy consumption prediction model is obtained based on a machine learning algorithm. The machine learning algorithm may be a neural network algorithm or a decision tree algorithm. In one example, the machine learning algorithm is a Gradient Boost Regression Tree (GBRT) algorithm.

Specifically, the energy consumption prediction data of the commercial electric vehicle can be obtained by substituting the discharge duration data and the driving position characteristic data into the energy consumption prediction model obtained based on the machine learning algorithm.

Further, the driving route of the commercial electric vehicle is relatively fixed, and a frequency of use is easily affected by a current service volume and the number of vehicles in service. Therefore, ambient temperature data in the same historical period and recent discharge duration data can be substituted into the energy consumption prediction model as model independent variables, to improve the accuracy of energy consumption prediction. For example, when there is a need to predict energy consumption in next three months, a discharge duration in recent three months and an ambient temperature in the same historical period are taken as input and substituted into the energy consumption prediction model.

In addition, after obtaining the energy consumption prediction data, the terminal may also output the energy consumption prediction data. An output object of the energy consumption prediction data may be a storage device, a display device or a communication device. In addition, the terminal may also output the energy consumption prediction data to other terminals through a communication device.

According to the above commercial electric vehicle energy consumption prediction method, the discharge duration data and the driving position characteristic data are substituted into the energy consumption prediction model to obtain the energy consumption prediction data. Since a driving route of the commercial electric vehicle is relatively fixed, driving position characteristic data corresponding to the driving route can reflect an actual driving environment of the commercial electric vehicle to some extent, which is beneficial to improve accuracy of the energy consumption prediction data. On the other hand, the energy consumption prediction model obtained based on the machine learning algorithm is used to perform energy consumption prediction, which can save tedious mathematical modeling and improve operation efficiency on the basis of ensuring accuracy.

It should be noted that, according to characteristics of the energy consumption prediction model obtained by the machine learning algorithm, in order to obtain continuous energy consumption prediction data with a set duration as a cycle, the discharge duration data can be interpolated before being substituted into the energy consumption prediction model, which ensures that the discharge duration data inputted into the model is continuous data with the set duration as a cycle, thereby ensuring continuity of the energy consumption prediction data. Alternatively, after discontinuous initial energy consumption prediction data is obtained, the initial energy consumption prediction data is interpolated to obtain continuous energy consumption prediction data of the commercial electric vehicle with the set duration as a cycle.

Figure 2:
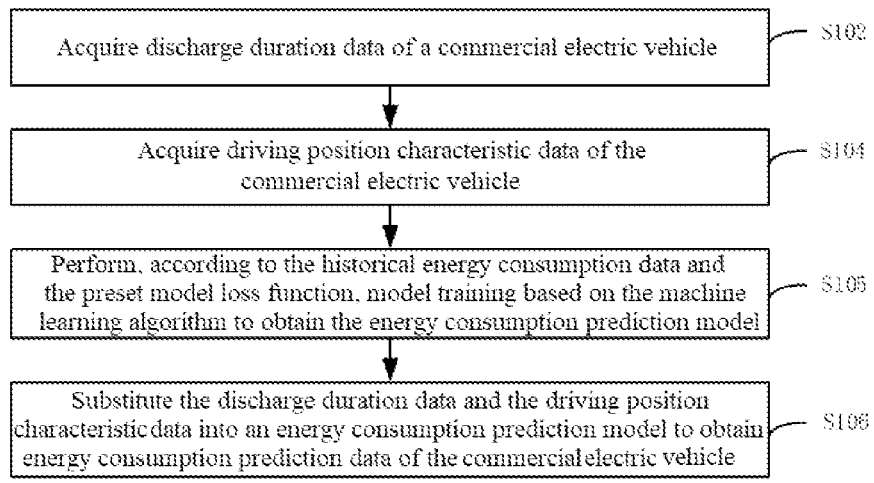
FIG. 2 is a schematic flow chart of a commercial electric vehicle energy consumption prediction method according to some examples of the present application.

In some examples, as shown in FIG. 2, prior to step S106, the method further includes step S105: performing, according to historical driving data and rated battery capacity of the commercial electric vehicle and a preset model loss function, model training based on the machine learning algorithm to obtain the energy consumption prediction model. Step S105 may be performed prior to or after step S102 and step S104, or synchronously with the above steps.

Specific limitations on the machine learning algorithm may be obtained with reference to the above. Details are not described herein. The historical driving data refers to actual data of the commercial electric vehicle during historical operation. Specifically, the terminal obtains actual energy consumption data for model training based on the historical driving data and the rated battery capacity of the commercial electric vehicle, and uses the preset model loss function to perform model training based on the machine learning algorithm to obtain the energy consumption prediction model.

Further, the model loss function may specifically be a mean square error function, an absolute loss function, a quantile loss function, or the like. For example, the energy consumption prediction model is a GBRT model, and a specific formula of the model loss function may be:

$$f_0(x) = \mathrm{argmin} \sum_{i=1}^{m} (y - f(x))^2 \quad (1)$$

where y denotes an actual value, and f (x) denotes a predicted value. Based on the above model loss function, a GBRT regression tree can be fitted by residual training according to a loss function where a difference between the predicted value and the actual value tends to be minimum, and then a GBRT model for energy consumption prediction can be obtained.

In the above examples, model training is performed based on the historical driving data of the commercial electric vehicle to obtain the energy consumption prediction model before the discharge duration data and the driving position characteristic data are substituted into the energy consumption prediction model to obtain the energy consumption prediction data of the commercial electric vehicle, which is beneficial to improve scientificity of the commercial electric vehicle energy consumption prediction method.

Figure 3:
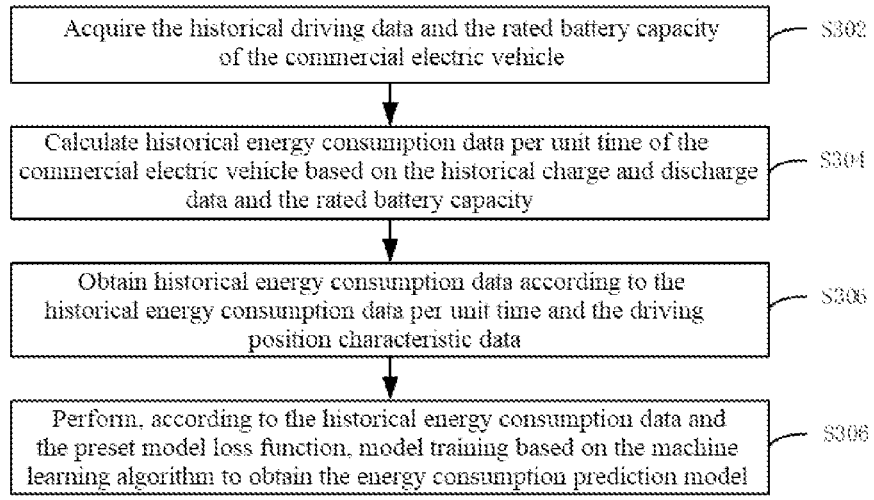
FIG. 3 is a schematic flow chart of training of an energy consumption prediction model according to some examples of the present application.

In some examples, as shown in FIG. 3, step S105 includes step S302 to step S308.

In step S302, the historical driving data and the rated battery capacity of the commercial electric vehicle are acquired.

The historical driving data includes historical charge and discharge data and historical driving position characteristic data. Further, the historical charge and discharge data includes charge and discharge start times and end times, charged capacity, an SOC corresponding to each time, and the like. The rated battery capacity refers to battery capacity under rated conditions. The historical driving position characteristic data is driving position characteristic data corresponding to time nodes where the historical charge and discharge data is located.

In step S304, historical energy consumption data per unit time of the commercial electric vehicle is calculated based on the historical charge and discharge data and the rated battery capacity.

The historical energy consumption data per unit time of the commercial electric vehicle refers to a data set composed of energy consumption values per unit time of the commercial electric vehicle with a set time as a cycle in a past period of time. Specifically, based on the historical charge and discharge data, the terminal can take the set time as a calculation cycle to obtain historical energy consumption and a discharge duration of the commercial electric vehicle in each cycle, and then obtain the historical energy consumption data per unit time of the commercial electric vehicle.

Further, a specific manner in which the terminal obtains historical energy consumption data per unit time of the commercial electric vehicle based on the historical charge and discharge data and the rated battery capacity is not unique. In one example, based on the historical charge and discharge data, the terminal multiplies an SOC difference between the discharge start and end times by the rated battery capacity to obtain historical discharge capacity of the commercial electric vehicle within the set time, and obtains the historical energy consumption data per unit time of the commercial electric vehicle with the preset duration in combination with the corresponding discharge durations. The preset duration may be one month, two months or three months, which may be specifically determined according to an energy consumption prediction requirement.

In step S306, historical energy consumption data is obtained according to the historical energy consumption data per unit time and the driving position characteristic data.

The historical energy consumption data refers to historical data including historical energy consumption data per unit time and historical driving position characteristic data. Specifically, the historical energy consumption data per unit time of a plurality of calculation cycles within the preset duration obtained in step S404 may be combined with the historical driving position characteristic data of the same commercial electric vehicle according to the time node where the calculation cycles are located to form historical energy consumption data including time, the historical energy consumption data per unit time, and the historical driving position characteristic data.

In step S308, according to the historical energy consumption data and the preset model loss function, model training is performed based on the machine learning algorithm to obtain the energy consumption prediction model.

Specifically, the energy consumption prediction model can be obtained by using the preset model loss function and the machine learning algorithm to perform model training based on the historical energy consumption data.

In the above examples, in the process of model training, the historical energy consumption data per unit time of the commercial electric vehicle is calculated first, and then model training is performed based on the historical energy consumption data per unit time and the historical driving position characteristic data to obtain the energy consumption prediction model, so that a relationship between energy consumption per unit time and driving position characteristics can be accurately represented, which is beneficial to improve a degree of matching between the energy consumption prediction model and an actual operating condition, thereby improving prediction accuracy of the model.

In some examples, the acquiring the historical driving data of the commercial electric vehicle includes: acquiring historical raw driving data of the commercial electric vehicle; and pre-processing the historical raw driving data to obtain the historical driving data of the commercial electric vehicle.

Specifically, the terminal can acquire the historical raw driving data of the commercial electric vehicle, and on the basis of the historical raw driving data, perform data pre-processing to obtain the historical driving data corresponding to the commercial electric vehicle. The historical raw driving data includes historical charge and discharge data, historical vehicle position information data, weather data and terrain data corresponding to each vehicle position, and the like.

For example, the terminal can pre-process the historical charge and discharge data, eliminate data rows with repeated and incomplete data information, and extract the charge data of each charge section of the commercial electric vehicle and discharge data of a discharge section corresponding to each charge section according to field information. The data rows with incomplete data information include data rows with empty dates, and data rows with missing data in the charge section or discharge section.

In the above examples, after the historical raw driving data of the commercial electric vehicle is acquired, the historical driving data can be obtained only by pre-processing the historical raw driving data, so as to prevent occurrence of repeated or incomplete historical driving data, which can effectively improve the prediction accuracy and prediction efficiency of the model.

Figure 4:
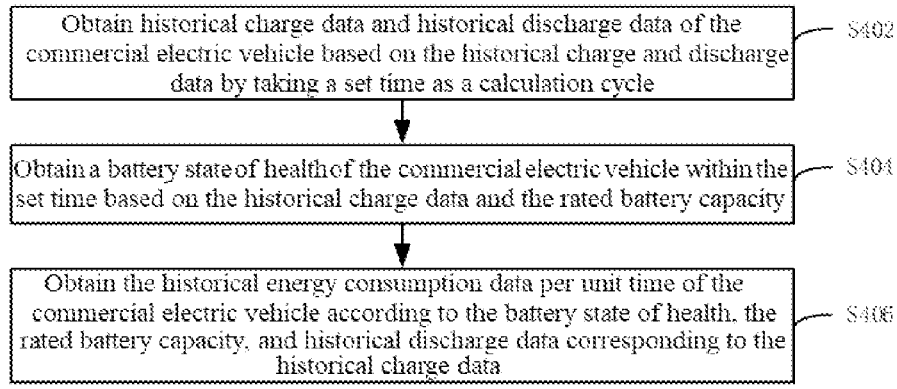
FIG. 4 is a schematic flow chart of analysis on historical energy consumption data per unit time according to some examples of the present application.

In some examples, referring to FIG. 4, step S304 includes step S402 to step S406.

In step S402, historical charge data and historical discharge data of the commercial electric vehicle are obtained based on the historical charge and discharge data by taking a set time as a calculation cycle.

The charge data includes a charge start time, a charge end time, charged capacity, an SOC corresponding to each time, and the like. The discharge data includes a discharge start time, a discharge end time, an SOC corresponding to each time, and the like. The historical charge data and the historical discharge data refer to actual charge data and actual discharge data in a past period of time, respectively.

Specifically, the terminal extracts and classifies information in the historical charge and discharge data. The data including "charge" field information is classified as charge data, and the data including "discharge" field information is classified as discharge data. Then, the set time is used as a cycle for secondary classification, and the historical charge data and the historical discharge data of the commercial electric vehicle in a plurality of cycles can be obtained.

In step S404: a battery state of health of the commercial electric vehicle within the set time is obtained based on the historical charge data and the rated battery capacity.

The battery state of health is also referred to as a State of Health (SOH), which is used to represent a capability of a current battery to store electrical energy relative to a new battery, and quantitatively describe a performance state of the current battery in the form of a percentage. The battery state of health is affected by a variety of factors such as a temperature, a current rate, and a cut-off voltage, and changes dynamically from the beginning of a battery life to the end of the battery life. Based on this, in order to improve the accuracy of the historical energy consumption data per unit time, the terminal calculates the battery state of health of the commercial electric vehicle within the set time based on the historical charge data and the rated battery capacity.

Specifically, a calculation formula of the battery state of health is:

$$SOH = \frac{Q}{\text{pack}_{cap} \times delt_{SOC_{charge}}} \quad (2)$$

In the formula, Q denotes the charged capacity, $\text{pack}_{cap}$ denotes the rated battery capacity, and $delt_{SOC_{charge}}$ denotes an SOC difference between a charge start time and a charge end time.

In step S406: the historical energy consumption data per unit time of the commercial electric vehicle is obtained according to the battery state of health, the rated battery capacity, and historical discharge data corresponding to the historical charge data.

The discharge data corresponding to the charge data refers to discharge data between a charge end time of a current charge section and a charge start time of next charge section.

Specifically, the terminal can obtain historical energy consumption of the commercial electric vehicle within the set time according to the battery state of health, the rated battery capacity, and the SOC difference between the discharge start time and the discharge end time, and then integrate historical energy consumption and a discharge duration of a plurality of calculation cycles within the preset duration to obtain an energy consumption value per unit time of each calculation cycle of the commercial electric vehicle within the preset duration. Within a period of time, a data set composed of energy consumption values per unit time of a plurality of calculation cycles is the historical energy consumption data per unit time.

A calculation formula of the energy consumption C within the set time is:

$$C = SOH \times \text{pack}_{cap} \times delt\_soc\_discharge \quad (3)$$

In the formula, delt_soc_discharge denotes the SOC difference between the discharge start time and the discharge end time.

A calculation formula of the energy consumption value per unit time Cper is:

$$Cper = \frac{C}{\text{hour\_discharge}} \quad (4)$$

In the formula, hour_discharge denotes the discharge duration, that is, the time difference between the discharge start time and the discharge end time.

In the above examples, in the process of calculating the historical energy consumption data per unit time of the commercial electric vehicle, the consideration of a real-time battery state of health of the vehicle helps improve the accuracy of the historical energy consumption data per unit time, thereby improving the prediction accuracy of the model.

In some examples, one charge section corresponds to a plurality of sub-discharge sections within the preset time; and step S406 of obtaining the historical energy consumption data per unit time of the commercial electric vehicle according to the battery state of health, the rated battery capacity, and historical discharge data corresponding to the historical charge data includes: obtaining the historical energy consumption data per unit time of the commercial electric vehicle according to the battery state of health, the rated battery capacity, and historical discharge data of the sub-discharge sections.

Specifically, if one charge section corresponds to a plurality of sub-discharge sections within the set time, the historical energy consumption data per unit time is obtained in combination with discharge data of the sub-discharge sections. Energy consumption corresponding to the discharge sections can be calculated respectively by using the above energy consumption calculation formula in combination with the battery state of health, the rated battery capacity, and the historical discharge data of the sub-discharge sections, and the energy consumption of the discharge sections can be added up to obtain total energy consumption and a total discharge duration of the discharge sections. The total energy consumption is divided by the total discharge duration to obtain the energy consumption value per unit time. Alternatively, an energy consumption value per sub-unit time of each sub-discharge section is calculated based on the discharge data of each discharge section, and then an average value or a median of the energy consumption value per sub-unit time is taken as the energy consumption value per unit time of the discharge section corresponding to the charge section.

In the above examples, when the historical energy consumption data per unit time is analyzed, in view of a case that one charge section corresponds to a plurality of sub-discharge sections within the set time, final analysis on the historical energy consumption data per unit time can be realized in combination with the historical discharge data of the sub-discharge sections, so as to effectively improve the reliability of the analysis on the historical energy consumption data per unit time.

In some examples, a plurality of charge sections exist within the set time; and step S406 includes: obtaining the historical energy consumption data per unit time of the commercial electric vehicle according to the battery state of health, the rated battery capacity, historical charge data of the charge sections, and historical discharge data of discharge sections corresponding to the charge sections.

Specifically, if a plurality of charge sections exist within the set time, energy consumption of discharge sections corresponding to the charge sections is calculated respectively according to charge data of the charge sections and discharge data of the discharge sections corresponding to the charge sections in combination with the battery state of health, the rated battery capacity, and the above energy consumption calculation formula. Then, according to the energy consumption of the discharge sections corresponding to the charge sections, different processing is performed to obtain the historical energy consumption data per unit time.

In the above examples, when the historical energy consumption data per unit time is analyzed, in view of a case that a plurality of charge sections exist within the set time, energy consumption of the discharge sections can be calculated respectively in combination with the historical discharge data of the discharge sections corresponding to the charge sections to finally realize the analysis on the historical energy consumption data per unit time, which can further improve the reliability of the analysis on the historical energy consumption data per unit time.

Further, in some examples, the obtaining the historical energy consumption data per unit time of the commercial electric vehicle according to the battery state of health, the rated battery capacity, historical charge data of the charge sections, and historical discharge data of discharge sections corresponding to the charge sections includes: obtaining energy consumption of the discharge sections corresponding to the charge sections according to the battery state of health, the rated battery capacity, the historical charge data of the charge sections, and the historical discharge data of the discharge sections corresponding to the charge sections; calculating, if a maximum energy consumption value in the energy consumption of the discharge sections corresponding to the charge sections is less than the rated battery capacity, historical energy consumption data per unit time within the set time according to the maximum energy consumption value; calculating, if the maximum energy consumption value in the energy consumption of the discharge sections corresponding to the charge sections is greater than or equal to the rated battery capacity and less than a preset multiple of the rated battery capacity, the historical energy consumption data per unit time within the set time according to an average value of the energy consumption of the discharge sections corresponding to the charge sections; and discarding, if the maximum energy consumption value in the energy consumption of the discharge sections corresponding to the charge sections is greater than or equal to the preset multiple of the rated battery capacity, the historical charge and discharge data within the corresponding set time.

The preset multiple is a real number greater than 1, such as 1.1, 1.2 or 1.3. The energy consumption of the discharge sections corresponding to the charge sections is calculated in combination with the above energy consumption calculation formula. Details are not described herein. In addition, prior to the calculation of the energy consumption value per unit time, abnormal values of the energy consumption and the discharge duration can be processed based on statistical rules, so as to prevent the influence of abnormal data and further improve the accuracy of energy consumption prediction. For example, ±3*sigma or other rules can be used to remove outliers in the historical energy consumption. ±1*sigma or other rules can be used to remove outliers of the energy consumption values per unit time corresponding to the historical energy consumption. Discharge duration data of <−1*sigma and >+3*sigma is removed.

In the above examples, different processing is performed according to the energy consumption of the discharge sections corresponding to the charge sections, different historical energy consumption data per unit time is analyzed in combination with different intervals thereof, and under abnormal circumstances, historical charge and discharge data within a corresponding cycle can be discarded, which effectively improves the accuracy of the analysis on the historical energy consumption data per unit time.

Figure 5:
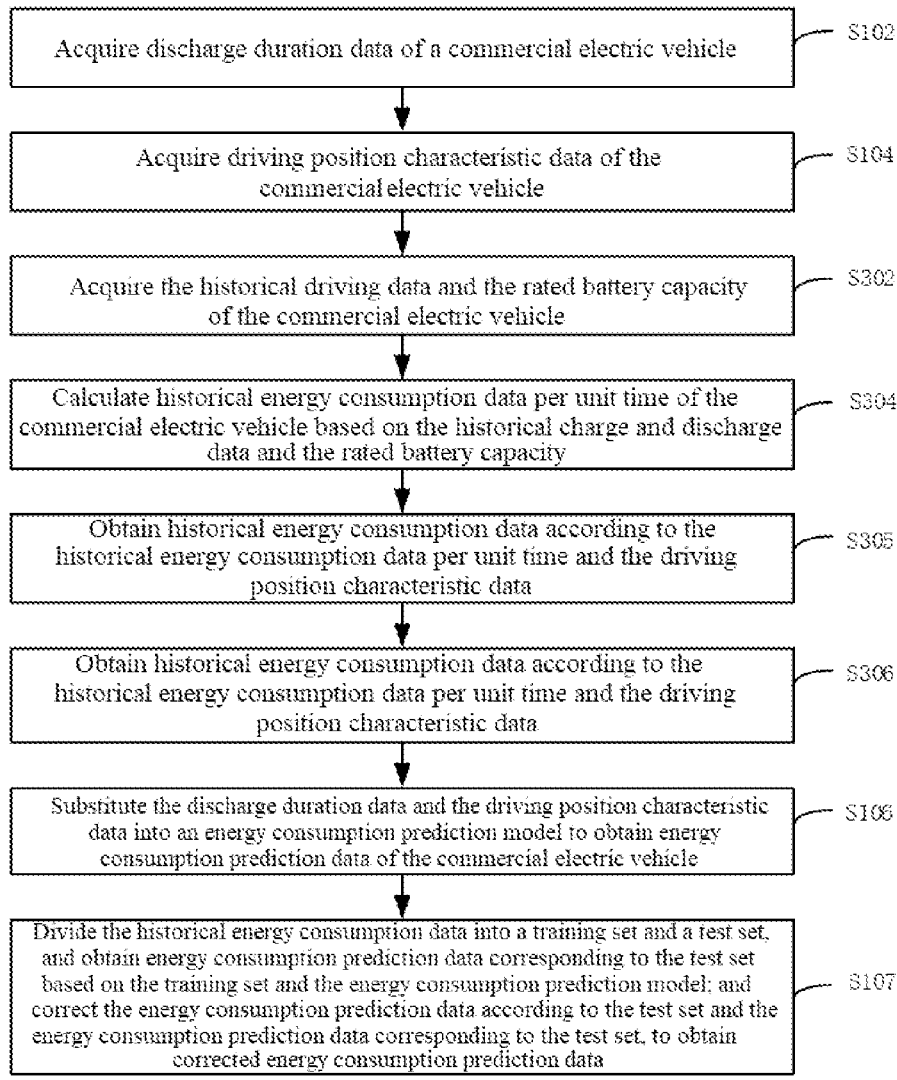
FIG. 5 is a schematic flow chart of a commercial electric vehicle energy consumption prediction method according to some examples of the present application.

Referring to FIG. 5, in some examples, after step S106, the method further includes step S107: dividing the historical energy consumption data into a training set and a test set, and obtaining energy consumption prediction data corresponding to the test set based on the training set and the energy consumption prediction model; and correcting the energy consumption prediction data according to the test set and the energy consumption prediction data corresponding to the test set, to obtain corrected energy consumption prediction data. Step S107 is performed prior to step S108.

Specifically, the historical energy consumption data can be divided into two parts, i.e., a training set and a test set, according to a preset ratio, and the training set is substituted into the energy consumption prediction model to obtain the energy consumption prediction data corresponding to the test set. Then, actual energy consumption data in the test set is compared with the corresponding energy consumption prediction data to determine a model prediction error sequence, and then a corrected value of the energy consumption prediction model is determined according to the error sequence. Further, the manner in which the terminal determines the corrected value of the energy consumption prediction model according to the error sequence is not unique. For example, a median or an average value in the error sequence may be used as the corrected value of the energy consumption prediction model.

A calculation formula of an error value in the model prediction error sequence is:

$$\text{error}_i = Cp1_i - Ca_i \tag{5}$$

In the formula, $\text{error}_i$ denotes an error value corresponding to an $i^{th}$ piece of data in the test set; $Ca_i$ denotes an actual value of energy consumption data per $i^{th}$ unit time in the test set; and $Cp1_i$ denotes a predicted energy consumption value corresponding to $Ca_i$.

After the corrected value of the energy consumption prediction model is obtained, the energy consumption prediction data is corrected based on the corrected value, and a corrected predicted energy consumption value can be obtained by superimposing the obtained predicted initial energy consumption value on the corrected value of the energy consumption prediction model. That is, a predicted final energy consumption value corresponding to Formula (5) is:

$$\text{Cpredict\_final}_i = \text{Cpredict\_value}_i - \text{error} \tag{6}$$

In the formula, error denotes the corrected value of the energy consumption prediction model, $\text{Cpredict\_value}_i$ denotes an $i^{th}$ predicted initial energy consumption value, and $\text{Cpredict\_final}_i$ denotes the corrected predicted energy consumption value corresponding to $\text{Cpredict\_value}_i$. A data set composed of the corrected predicted energy consumption values is the energy consumption prediction data of the commercial electric vehicle.

It should be noted that the value of the preset ratio is not unique. For example, according to a preset ratio of 4:1, 80% of the actual energy consumption data can be taken as the training set, and the remaining 20% can be used as the test set. Alternatively, according to a preset ratio of 3:2, 60% of the actual energy consumption data can be taken as the training set, and the remaining 40% can be used as the test set.

In the above examples, after the energy consumption prediction data is obtained, the energy consumption prediction result is further corrected based on the training set and the test set, which can further improve the prediction accuracy of the commercial electric vehicle energy consumption prediction method.

In some examples, the substituting the discharge duration data and the driving position characteristic data into an energy consumption prediction model includes: interpolating the discharge duration data to obtain interpolated discharge duration data, and substituting the interpolated discharge duration data and the driving position characteristic data into the energy consumption prediction model.

The interpolation refers to interpolating a continuous function on the basis of discrete data, so that this continuous curve passes through all given discrete data points. Through the interpolation processing, an approximate value of the function at other points can be estimated through the value of the function at a limited number of points.

Specifically, some of the historical charge and discharge data may be missing, and under an actual operating condition, data information may be incomplete within a set duration, for example, the data of the discharge section is missing. Therefore, the discharge duration data acquired in step S102 may be discontinuous data, and calculated values of one or more cycles within the preset duration are missing. Based on this, the discharge duration data is first interpolated to obtain continuous discharge duration data with the set duration as a cycle after the interpolation processing, and then the continuous discharge duration data and the driving position characteristic data are substituted into the energy consumption prediction model.

In the above examples, the discharge duration data is interpolated before being substituted into the energy consumption prediction model, which can ensure continuity of the discharge duration data inputted to the model and then ensure continuity of the energy consumption prediction data, being beneficial to improve flexibility of the commercial electric vehicle energy consumption prediction method.

Figure 6:
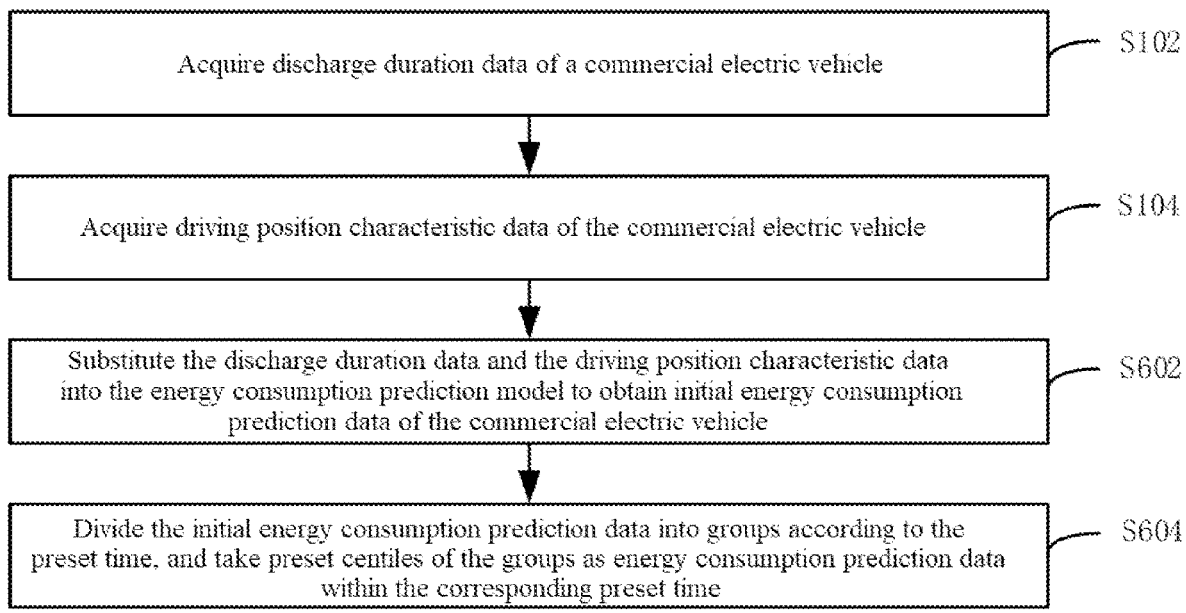
FIG. 6 is a schematic flow chart of a commercial electric vehicle energy consumption prediction method according to some examples of the present application.

Referring to FIG. 6, in some examples, step S106 includes step S602 and step S604.

In step S602, the discharge duration data and the driving position characteristic data are substituted into the energy consumption prediction model to obtain initial energy consumption prediction data of the commercial electric vehicle.

The initial energy consumption prediction data is a predicted value of the energy consumption prediction model. Specifically, the initial energy consumption prediction data of the commercial electric vehicle can be obtained by substituting the discharge duration data and the driving position characteristic data into the energy consumption prediction model.

In step S604, the initial energy consumption prediction data is divided into groups according to the preset time, and preset centiles of the groups are taken as energy consumption prediction data within the corresponding preset time.

The discharge duration data is actual data of a plurality of calculation cycles in a past preset duration. The initial energy consumption prediction data is prediction data of a plurality of calculation cycles corresponding to the discharge duration data. That is, the initial energy consumption prediction data includes prediction data of a plurality of calculation cycles within a preset duration in the future.

Further, a set of data is sorted in ascending order, and corresponding cumulative percentiles are calculated. Then, the value of the data corresponding to a certain percentile is referred to as a centile of the percentile. It is not difficult to understand that a predicted initial energy consumption value corresponding to the preset centile greater than 50% is a larger value in a set of initial energy consumption prediction data. The specific value of the preset centile is not unique, for example, a 85% quantile, 90% quantile or 95% quantile.

Specifically, the terminal divides the initial energy consumption data into groups according to a preset time to obtain a plurality of groups of prediction data, takes a larger preset quantile in each group of data as energy consumption prediction data of the group, and then obtains the energy consumption prediction data of the commercial electric vehicle within the entire preset duration.

It should be noted that, among the three time concepts involved in the above, i.e., the preset duration, the preset time, and the calculation cycle, a time span of the preset duration is the largest, and a time span of the calculation cycle is the smallest. Further, the value of the preset time is not unique, which may be flexibly set according to the preset duration and the calculation cycle. For example, when the preset time is three months and the calculation period is one day, the preset duration may be set to 10 days or 15 days.

In the above examples, the initial energy consumption prediction data predicted by the energy consumption prediction model is divided into groups and then a large preset centile of the groups is taken as the energy consumption prediction data, which can eliminate the interference of noise values and improve the accuracy of the energy consumption prediction data.

Figure 7:
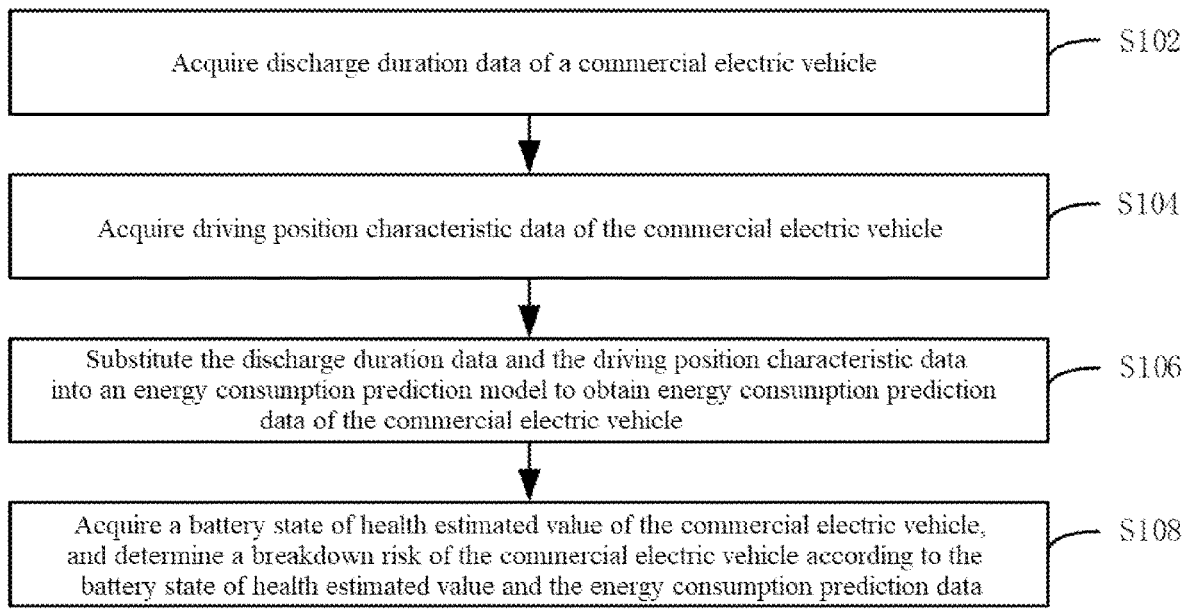
FIG. 7 is a schematic flow chart of a commercial electric vehicle energy consumption prediction method according to some examples of the present application.

In some examples, as shown in FIG. 7, after step S106, the method further includes step S108: acquiring a battery state of health estimated value of the commercial electric vehicle, and determining a breakdown risk of the commercial electric vehicle according to the battery state of health estimated value and the energy consumption prediction data.

The battery state of health is also referred to as an SOH, which is used to represent a capability of a current battery to store electrical energy relative to a new battery, and quantitatively describe a performance state of the current battery in the form of a percentage. The battery state of health is affected by a variety of factors such as a temperature, a current rate, and a cut-off voltage, and changes dynamically from the beginning of a battery life to the end of the battery life.

Specifically, the terminal acquires the battery state of health estimated value of the commercial electric vehicle, and multiplies the battery state of health estimated value by the rated battery capacity to obtain battery power in the calculation cycle, and then judges whether the commercial electric vehicle has a risk of breaking down in combination with energy consumption prediction data in the same calculation cycle. If the battery power corresponding to battery state of health estimated values in calculation cycles of a consecutive set number of times is less than the predicted energy consumption value in the corresponding calculation cycle, it is considered that the vehicle has a high risk of breaking down. The specific value of the consecutive set number of times may be 4, 5 or 6.

Further, after the breakdown risk of the commercial electric vehicle is determined, warning information may also be outputted to prompt a user to take a corresponding risk prevention measure, for example, prompt the user to strengthen a monitoring frequency of the vehicle, or prompt the user to prepare a spare part, or the like.

In the above examples, after the energy consumption prediction data of the commercial electric vehicle is obtained, a battery state of health estimated value of the commercial electric vehicle is further acquired, and a breakdown risk of the commercial electric vehicle is determined according to the battery state of health estimated value and the energy consumption prediction data, which can facilitate a user to find an anomaly in time and take a corresponding measure, is conducive to reducing the probability of breakdown of the commercial electric vehicle, and improves safety of use of the vehicle.

Figure 8:
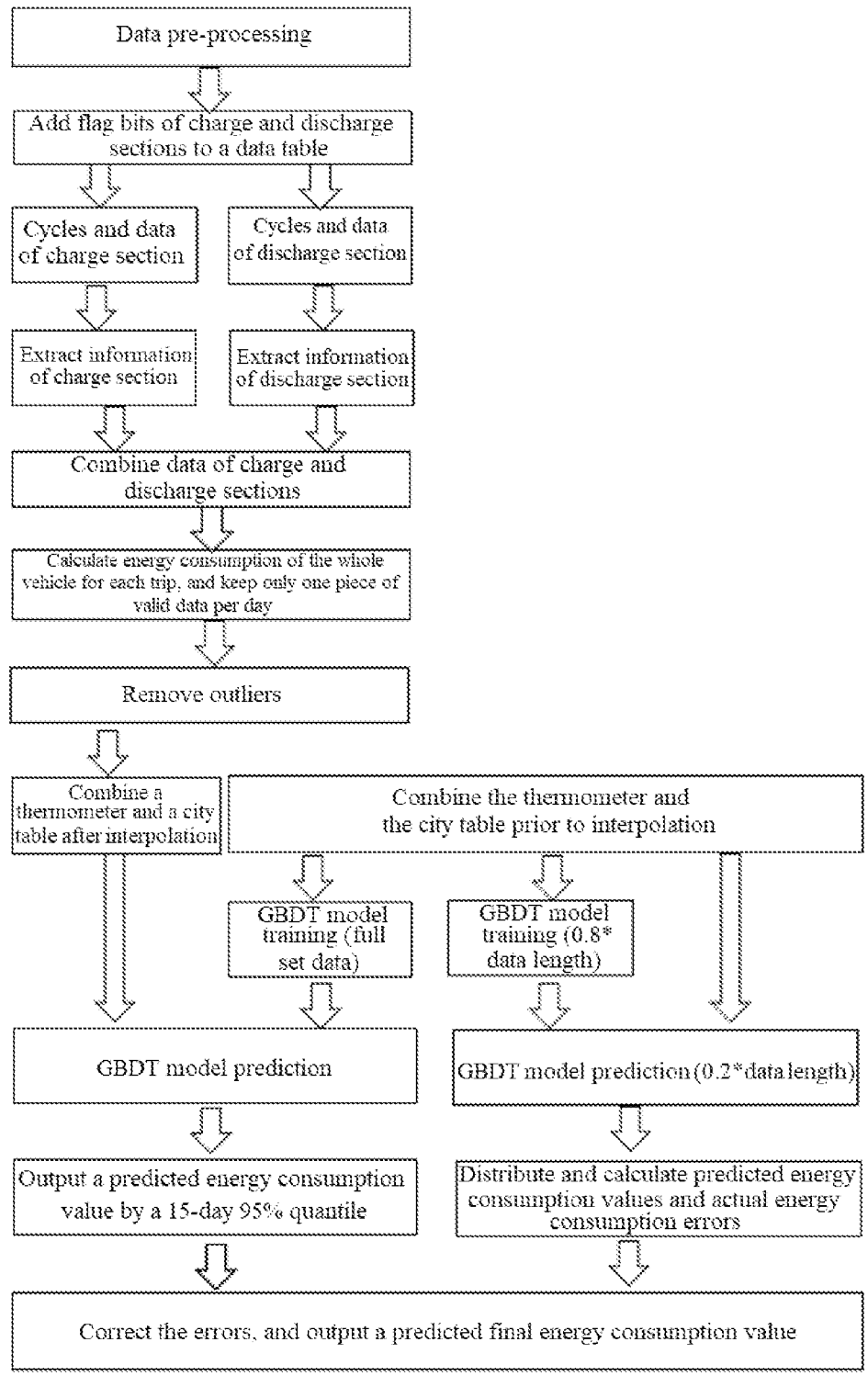
FIG. 8 is a flow chart of a commercial electric vehicle energy consumption prediction method according to some examples of the present application.

For ease of understanding, the commercial electric vehicle energy consumption prediction method is described in detail below with reference to FIG. 8.

The terminal acquires the historical driving data and the rated battery capacity of the commercial electric vehicle. The historical driving data includes historical charge and discharge data and historical driving characteristic data. The driving characteristic data includes cities where the commercial electric vehicle is located at different times, and air temperatures corresponding to the cities. After the acquisition of the historical driving data, data pre-processing is performed first to remove repeated data rows with empty dates, and extract data segment information of charge and discharge sections of each vehicle, for example, extract a start SOC and an end SOC of each charge section and charged capacity Q, and extract information such as a start SOC and an end SOC of each discharge section and a discharge section duration. Then, the data of the charge and discharge sections are combined, each charge section corresponds to at least one discharge section, and the data of only the charge section or only the discharge section is discarded. The discharge section corresponding to the charge section refers to a discharge section between a charge end time of a current charge section and a charge start time of next charge section.

After the corresponding historical charge and discharge data is obtained, the historical energy consumption data per unit time of the vehicle is obtained with one day as a calculation cycle based on the historical charge and discharge data. Specifically, firstly, based on the historical charge data and the rated battery capacity, the battery state of health SOH of the commercial electric vehicle within the calculation cycle is obtained according to Calculation Formula (2) of the battery state of health. Then, the calculated SOH, the rated battery capacity, and discharge data corresponding to the charge data are substituted into Formulas (3) and (4) to obtain the energy consumption C of the vehicle in the corresponding calculation cycle and the energy consumption value per unit time Cper.

If one charge section corresponds to a plurality of sub-discharge sections in one calculation cycle, the energy consumption value per unit time is calculated in combination with the discharge data of the sub-discharge sections. Specifically, the energy consumption of the discharge sections can be added up to obtain total energy consumption and a total discharge duration of the discharge sections. The total energy consumption is divided by the total discharge duration to obtain the energy consumption value per unit time. Alternatively, an energy consumption value per sub-unit time of each sub-discharge section is calculated based on the discharge data of each discharge section, and then an average value or a median of the energy consumption value per sub-unit time is taken as the energy consumption value per unit time of the discharge section corresponding to the charge section.

If a plurality of charge sections exist in one calculation cycle, the energy consumption of the discharge section corresponding to each charge section is calculated according to the charge data of the charge section and the discharge data of the discharge section corresponding to the charge section. Then, different processing is performed according to the energy consumption of the discharge section corresponding to each charge section. If a maximum energy consumption value in the energy consumption of the discharge sections corresponding to the charge sections is less than the rated battery capacity, an energy consumption data value per unit time within the set time is calculated based on the maximum energy consumption value. If the maximum energy consumption value in the energy consumption of the discharge sections corresponding to the charge sections is greater than or equal to the rated battery capacity and less than 1.2 times the rated battery capacity, the energy consumption data value per unit time within the set time is calculated based on an average value of the energy consumption of the discharge sections corresponding to the charge sections. If the maximum energy consumption value in the energy consumption of the discharge sections corresponding to the charge sections is greater than or equal to 1.2 times the rated battery capacity, it is considered that the power consumption is abnormal and the charge and discharge data in the calculation cycle is discarded.

Further, prior to the calculation of the energy consumption value per unit time, abnormal values of the energy consumption and the discharge duration can be processed based on statistical rules, so as to prevent the influence of abnormal data and further improve the accuracy of energy consumption prediction. For example, ±3*sigma or other rules can be used to remove outliers in the historical energy consumption. ±1*sigma or other rules can be used to remove outliers of historical energy consumption values per unit time corresponding to the historical energy consumption. Historical discharge duration data of less than −1*sigma and greater than +3*sigma is removed.

The historical energy consumption data per unit time of the commercial electric vehicle within the preset duration can be obtained in combination with the historical energy consumption values per unit time of a plurality of calculation cycles within the preset duration. After the historical energy consumption data per unit time is obtained, on the one hand, the historical energy consumption data per unit time is combined with ambient temperature data of corresponding cities in the historical driving data to obtain a combined data set, and model training is performed based on the combined data set and a preset model loss function to obtain a GBRT model. The model loss function is Formula (1). On the other hand, the driving route of the commercial electric vehicle is relatively fixed, and a frequency of use is easily affected by a current service volume and the number of vehicles in service. Therefore, the historical discharge duration data is linearly interpolated to obtain continuous discharge duration data within a recent preset duration, and the continuous discharge duration data and ambient temperature data in the same historical period are used to predict future energy consumption of the vehicle. Specifically, energy consumption prediction data of the same period in the future can be obtained by substituting the continuous discharge duration data and the ambient temperature data of the same historical period into the GBRT model obtained by training. It may be understood that the GBRT model obtained by training can be configured to represent a relationship between energy consumption values per unit time and ambient temperatures. Based on this, the corresponding energy consumption data per unit time can be obtained according to the ambient temperature data in the same historical period, and then the energy consumption prediction data in the same period in the future can be obtained in combination with the continuous discharge duration data within a recent preset duration.

For example, an energy consumption value C(t) of next three months can be obtained by taking a discharge duration hour_discharge$_t$ of recent three months and an ambient temperature tempature$_t$ of the same historical period as model input X.

$$C(t)=f(\text{hour\_discharge}_t, \text{tempature}_t) \qquad (7)$$

After the energy consumption prediction data is obtained, the energy consumption prediction data is divided into groups according to the preset time, and a preset 95% quantile of each group is taken as the energy consumption prediction data within the corresponding preset time. For example, the energy consumption prediction data in the next three months may be divided into groups by 15 days, and a 95% quantile of each group may be taken as a predicted energy consumption value of the group.

In order to further improve the accuracy of the energy consumption prediction data, the historical energy consumption data can be divided into two parts, i.e., a training set and a test set, according to a preset ratio of 4:1, and the training set is substituted into the energy consumption prediction model to obtain the energy consumption prediction data corresponding to the test set. Then, actual energy consumption data in the test set is compared with the corresponding energy consumption prediction data, and a model prediction error sequence is determined according to Formula (5). Finally, a median in the error sequence is determined as a corrected value of the energy consumption prediction model, and corrected final energy consumption prediction data can be obtained by correcting the predicted energy consumption value based on Formula (6).

In addition, after obtaining the corrected final energy consumption prediction data, the terminal may further acquire a battery state of health estimated value of the commercial electric vehicle, and multiply the battery state of health estimated value by the rated battery capacity to obtain battery power in the calculation cycle, and then judge whether the commercial electric vehicle has a risk of breaking down in combination with energy consumption prediction data in the same calculation cycle. If the battery power corresponding to battery state of health estimated values in 5 consecutive calculation cycles is less than the predicted energy consumption value in the corresponding calculation cycle, it is considered that the vehicle has a high risk of breaking down. Further, after the breakdown risk of the commercial electric vehicle is determined, warning information may also be outputted to prompt a user to take a corresponding risk prevention measure, for example, prompt the user to strengthen a monitoring frequency of the vehicle, or prompt the user to prepare a spare part, or the like.

According to the above commercial electric vehicle energy consumption prediction method, the discharge duration data and the driving position characteristic data are substituted into the energy consumption prediction model to obtain the energy consumption prediction data. Since a driving route of the commercial electric vehicle is relatively fixed, driving position characteristic data corresponding to the driving route can reflect an actual driving environment of the commercial electric vehicle to some extent, which is beneficial to improve accuracy of the energy consumption prediction data. On the other hand, the energy consumption prediction model obtained based on the machine learning algorithm is used to perform energy consumption prediction, and an error term is introduced, which can save tedious mathematical modeling and improve operation efficiency on the basis of ensuring accuracy. In addition, after the energy consumption prediction data of the commercial electric vehicle is obtained, the battery state of health estimated value of the commercial electric vehicle is further acquired, and the breakdown risk of the commercial electric vehicle is determined according to the battery state of health estimated value and the energy consumption prediction data, which can facilitate a user to find an anomaly in time and take a corresponding measure, is conducive to reducing the probability of breakdown of the commercial electric vehicle, and improves safety of use of the vehicle.

It should be understood that, although the steps in the flow charts involved in the above examples are sequentially displayed according to the arrows, these steps are not necessarily executed sequentially in the order indicated by the arrows. Unless explicitly stated herein, the execution of these steps is not strictly limited to the order, and the steps may be executed in other orders. Moreover, at least a part of the steps in the flow charts involved in the above examples may include a plurality of steps or a plurality of stages, and these steps or stages are not necessarily executed and completed at the same time, but may be performed at different times. The steps or stages are not necessarily executed in sequence, but may be executed alternately or in turn with other steps or at least a part of steps or stages in other steps.

Based on the same inventive concept, in a second aspect, an example of the present application further provides a commercial electric vehicle energy consumption prediction apparatus for implementing the above commercial electric vehicle energy consumption prediction method. An implementation solution to the problem provided by the apparatus is similar to the implementation solution described in the above method. Therefore, specific limitations in one or more examples of the commercial electric vehicle energy consumption prediction apparatus provided below can be obtained with reference to the limitations to the commercial electric vehicle energy consumption prediction method hereinabove. Details are not described herein.

Figure 9:
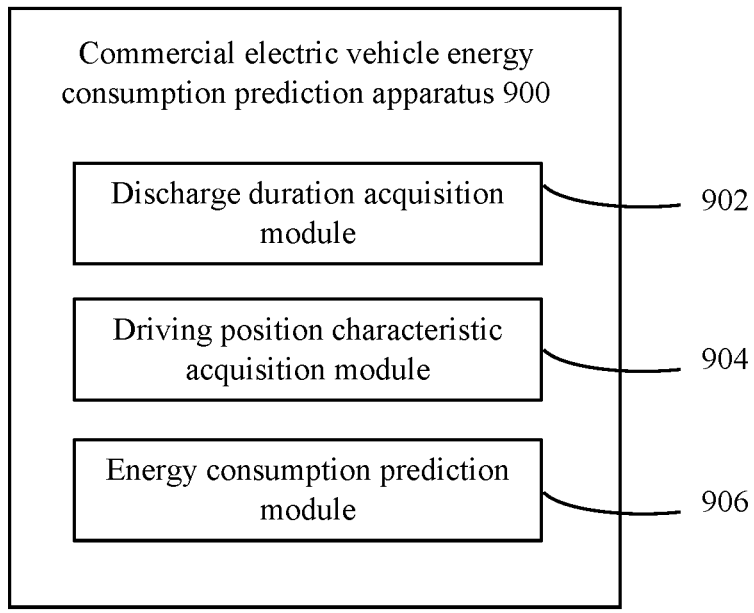
FIG. 9 is a schematic structural diagram of a commercial electric vehicle energy consumption prediction apparatus according to some examples of the present application.

In some examples, as shown in FIG. 9, a commercial electric vehicle energy consumption prediction apparatus 900 is provided, including a discharge duration acquisition module 902, a driving position characteristic acquisition module 904, and an energy consumption prediction 906.

The discharge duration acquisition module 902 is configured to acquire discharge duration data of a commercial electric vehicle. The driving position characteristic acquisition module 904 is configured to acquire driving position characteristic data of the commercial electric vehicle. The energy consumption prediction module 906 is configured to substitute the discharge duration data and the driving position characteristic data into an energy consumption prediction model to obtain energy consumption prediction data of the commercial electric vehicle. The energy consumption prediction model is obtained based on a machine learning algorithm.

Figure 10:
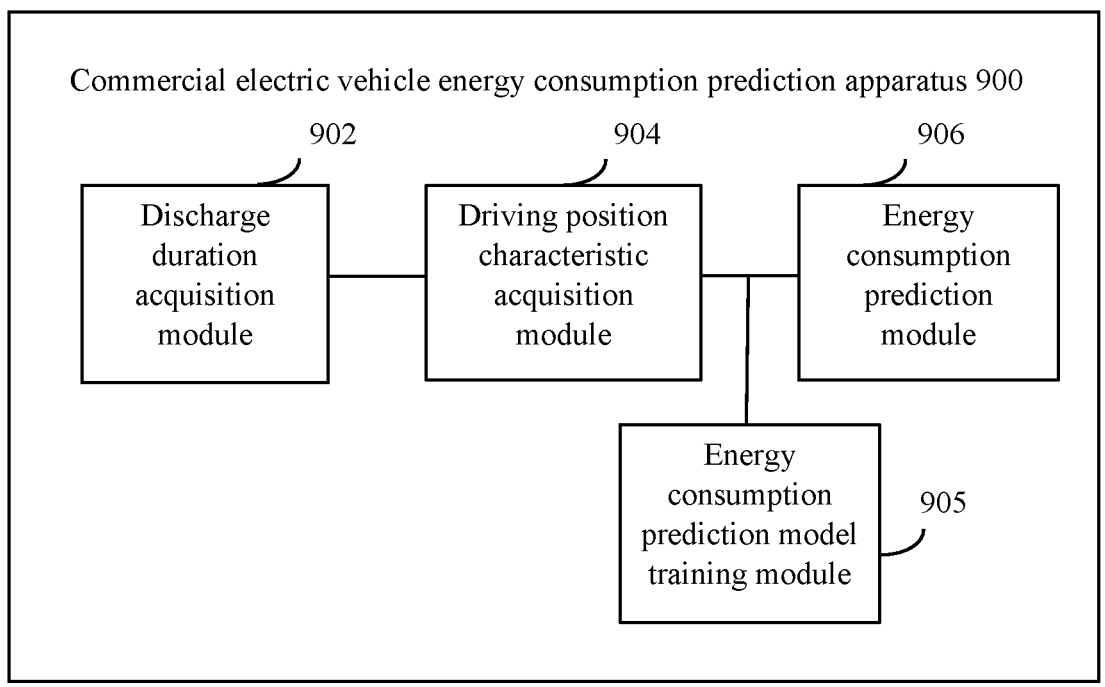
FIG. 10 is a schematic structural diagram of a commercial electric vehicle energy consumption prediction apparatus according to some examples of the present application.

Referring to FIG. 10, in some examples, the commercial electric vehicle energy consumption prediction apparatus 900 further includes: an energy consumption prediction model training module 905 configured to perform, according to historical driving data and rated battery capacity of the commercial electric vehicle and a preset model loss function, model training based on the machine learning algorithm to obtain the energy consumption prediction model.

Figure 11:
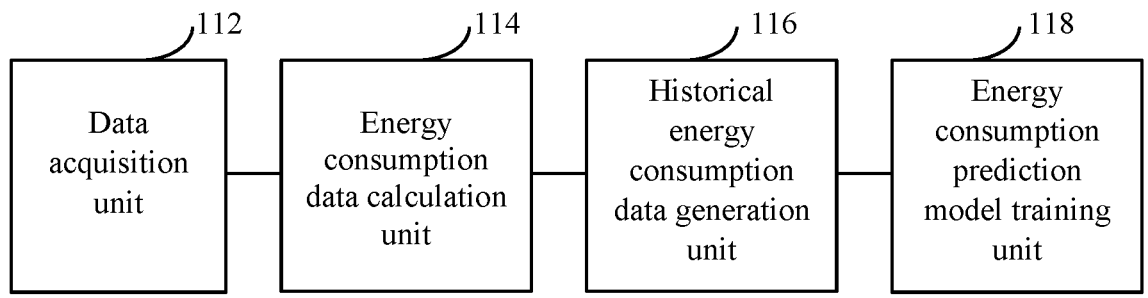
FIG. 11 is a schematic structural diagram of an energy consumption prediction model according to some examples of the present application.

Referring to FIG. 11, in some examples, the energy consumption prediction model training module 905 includes: a data acquisition unit 112 configured to acquire the historical driving data and the rated battery capacity of the commercial electric vehicle; the historical driving data including historical charge and discharge data and historical driving position characteristic data; an energy consumption data calculation unit 114 configured to calculate historical energy consumption data per unit time of the commercial electric vehicle based on the historical charge and discharge data and the rated battery capacity; a historical energy consumption data generation unit 116 configured to obtain historical energy consumption data according to the historical energy consumption data per unit time and the historical driving position characteristic data; and an energy consumption prediction model training unit 118 configured to perform, according to the historical energy consumption data and the preset model loss function, model training based on the machine learning algorithm to obtain the energy consumption prediction model.

In some examples, the energy consumption data calculation unit 114 is specifically configured to: obtain historical charge data and historical discharge data of the commercial electric vehicle based on the historical charge and discharge data by taking a set time as a cycle; obtain a battery state of health of the commercial electric vehicle within the set time based on the historical charge data and the rated battery capacity; and obtain the historical energy consumption data per unit time of the commercial electric vehicle according to the battery state of health, the rated battery capacity, and historical discharge data corresponding to the historical charge data.

Figure 12:
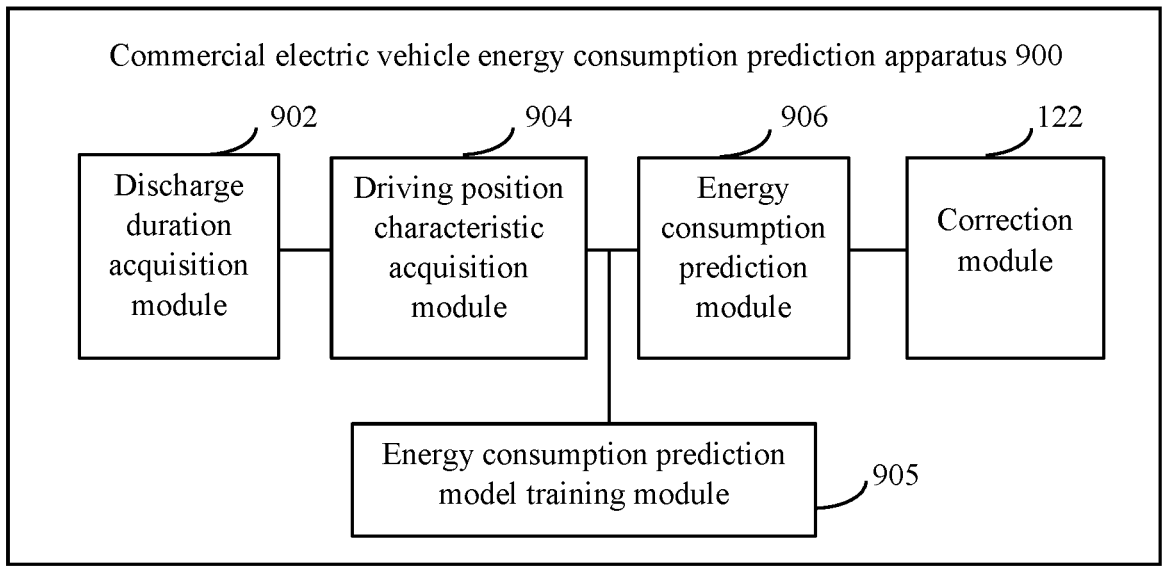
FIG. 12 is a schematic structural diagram of a commercial electric vehicle energy consumption prediction apparatus according to some examples of the present application.

Referring to FIG. 12, in some examples, the commercial electric vehicle energy consumption prediction apparatus 900 further includes: a correction module 122 configured to divide the historical energy consumption data into a training set and a test set, and obtain energy consumption prediction data corresponding to the test set based on the training set and the energy consumption prediction model; and correct the energy consumption prediction data according to the test set and the energy consumption prediction data corresponding to the test set, to obtain corrected energy consumption prediction data.

In some examples, the energy consumption prediction module 906 is specifically configured to: interpolate the discharge duration data to obtain interpolated discharge duration data, and substitute the interpolated discharge duration data and the driving position characteristic data into the energy consumption prediction model.

Figure 13:
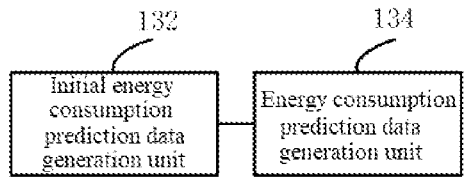
FIG. 13 is a schematic structural diagram of an energy consumption prediction module according to some examples of the present application.

Referring to FIG. 13, in some examples, the energy consumption prediction module 906 includes: an initial energy consumption prediction data generation unit 132 configured to substitute the discharge duration data and the driving position characteristic data into the energy consumption prediction model to obtain initial energy consumption prediction data of the commercial electric vehicle; and an energy consumption prediction data generation unit 134 configured to divide the initial energy consumption prediction data into groups according to the preset time, and take preset centiles of the groups as energy consumption prediction data within the corresponding preset time; the preset centiles being greater than 50%.

Figure 14:
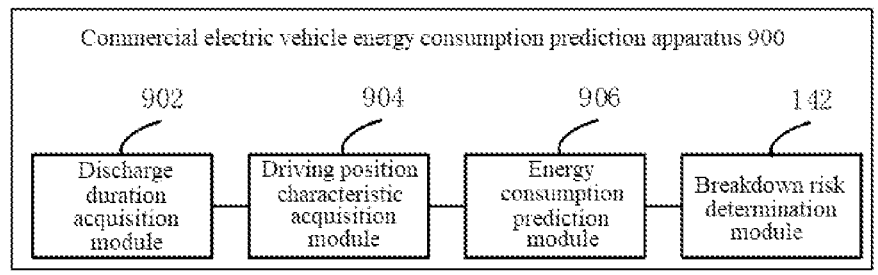
FIG. 14 is a schematic structural diagram of a commercial electric vehicle energy consumption prediction apparatus according to some examples of the present application.

Referring to FIG. 14, in some examples, the commercial electric vehicle energy consumption prediction apparatus 900 further includes: a breakdown risk determination module 142 configured to acquire a battery state of health estimated value of the commercial electric vehicle, and determine a breakdown risk of the commercial electric vehicle according to the battery state of health estimated value and the energy consumption prediction data.

Each module in the above commercial electric vehicle energy consumption prediction apparatus may be implemented in whole or in part by software, hardware and combinations thereof. The above modules can be embedded in or independent of a processor in a computer device in the form of hardware, or stored in a memory in the computer device in the form of software, so that the processor can call and execute the operations corresponding to the above modules.

Figure 15:
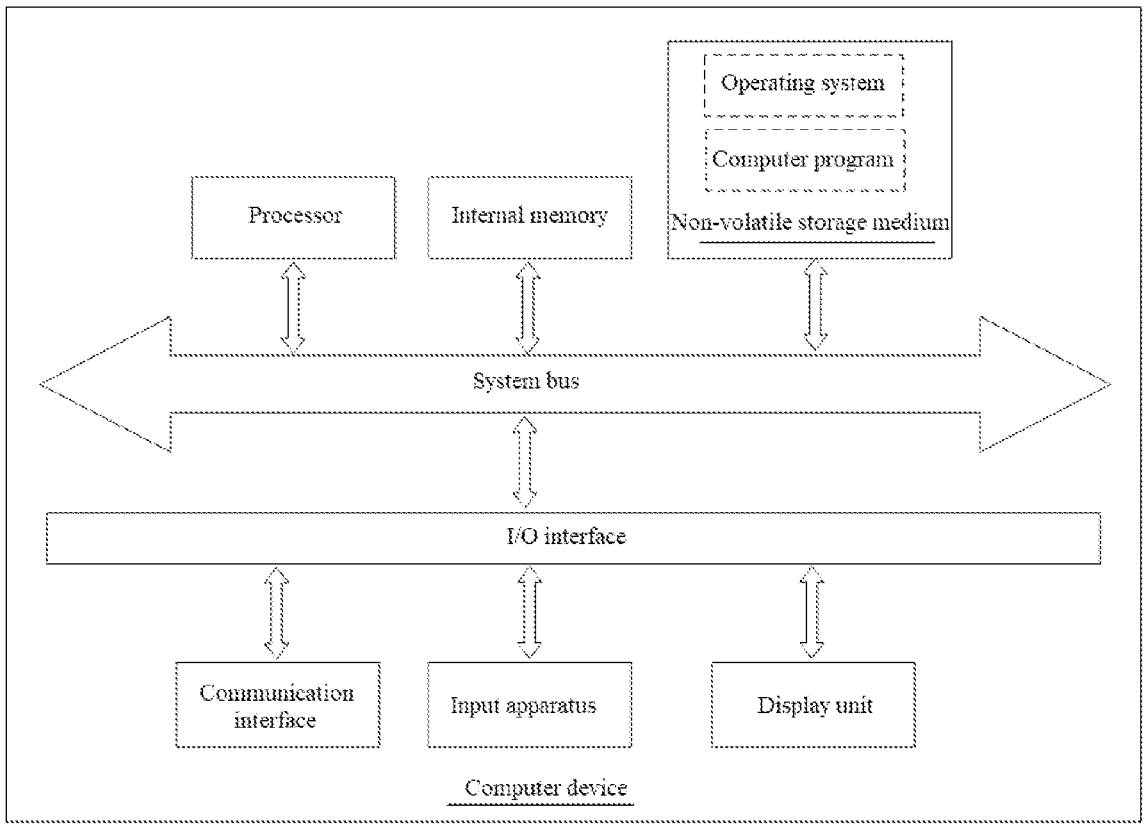
FIG. 15 is a schematic diagram of an internal structure of a computer device according to some examples of the present application.

In some examples, a computer device is provided. The computer device may be a terminal, and an internal structure diagram thereof may be as shown in FIG. 15. The computer device includes a processor, a memory, a communication interface, a display screen, and an input apparatus connected by a system bus. The processor of the computer device is configured to provide computing and control capabilities. The memory of the computer device includes a non-volatile storage medium and an internal memory. The non-volatile storage medium stores an operating system and a computer program. The internal memory provides an environment for the execution of the operating system and the computer program in the non-volatile storage medium. The communication interface of the computer device is configured for wired or wireless communication with an external terminal. The wireless communication can be realized by WIFI, a mobile cellular network, Near Field Communication (NFC) or other technologies. When the computer program is executed by the processor, a commercial electric vehicle energy consumption prediction method is implemented. The display screen of the computer device may be a liquid crystal display screen or an electronic ink display screen. The input apparatus of the computer device may be a touch layer covering the display screen, or may be a key, a trackball, or a touchpad disposed on a housing of the terminal, or may be an external keyboard, a touchpad, a mouse, or the like.

Those skilled in the art can understand that the structure shown in FIG. 15 is only a block diagram of a partial structure relevant to the solution of the present application, and does not constitute a limitation on the computer device to which the solution of the present application is applied. A specific computer device may include more or fewer components than those shown in the figures, or combine certain components, or have a different arrangement of components.

In some examples, a computer device is provided, including a memory and a processor. A computer program is stored in the memory, and the processor implements the steps in the above method examples when executing the computer program.

In some examples, a computer-readable storage medium is provided, storing a computer program. When the computer program is executed by a processor, the steps in the above method examples are implemented.

In some examples, a computer program product is provided, including a computer program. When the computer program is executed by a processor, the steps in the above method examples are implemented.

Those of ordinary skill in the art can understand that all or part of the process in the method of the above examples can be implemented by instructing the relevant hardware through a computer program. The computer program can be stored in a non-volatile computer-readable storage medium. When the computer program is executed, the processes of the examples of the above methods may be included. Any reference to a memory, a database or other media used in the various examples provided in the present application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external cache memory, or the like. By way of illustration instead of limitation, the RAM is available in a variety of forms, such as a static random access memory (SRAM), a dynamic random access memory (DRAM), or the like. The database involved in the various examples provided in the present application may include at least one of a relational database and a non-relational database. The non-relational database may include a blockchain-based distributed database, and the like, but is not limited thereto. The processor involved in the various examples provided in the present application may be a general-purpose processor, a central processing unit, a graphics processor, a digital signal processor, a programmable logic device, a data processing logic devices based on quantum computing, and the like, but is not limited thereto.

The technical features of the above examples can be combined arbitrarily. In order to make the description concise, not all possible combinations of the technical features in the above examples are described. However, all the combinations of the technical features should be considered as falling within the scope described in this specification provided that they do not conflict with each other.

The above examples only describe several embodiments of the present application, and the description thereof is specific and detailed, but cannot therefore be understood as a limitation on the patent scope of the present application. It should be noted that those of ordinary skill in the art may further make variations and improvements without departing from the concept of the present application, all of which fall within the protection scope of the present application. Therefore, the patent protection scope of the present application should be subject to the appended claims.

What is claimed is:

1. An electric vehicle energy consumption prediction method, comprising:
   obtaining discharge duration data of an electric vehicle;
   obtaining driving position characteristic data of the electric vehicle; and
   inputting the discharge duration data and the driving position characteristic data into an energy consumption prediction model to obtain energy consumption prediction data of the electric vehicle;
   wherein the energy consumption prediction model is obtained based on a machine learning algorithm.

2. The method according to claim 1, wherein, prior to inputting the discharge duration data and the driving position characteristic data into the energy consumption prediction model to obtain energy consumption prediction data of the commercial electric vehicle, the method further comprises:
   performing, according to historical driving data and rated battery capacity of the electric vehicle and a preset model loss function, model training based on the machine learning algorithm, to obtain the energy consumption prediction model.

3. The method according to claim 2, wherein performing, according to historical driving data and rated battery capacity of the electric vehicle and a preset model loss function, model training based on the machine learning algorithm to obtain the energy consumption prediction model comprises:
 obtaining the historical driving data and the rated battery capacity of the electric vehicle, wherein the historical driving data comprises historical charge and discharge data and historical driving position characteristic data;
 calculating historical energy consumption data per unit time of the electric vehicle based on the historical charge and discharge data and the rated battery capacity;
 obtaining historical energy consumption data according to the historical energy consumption data per unit time and the historical driving position characteristic data; and
 performing, according to the historical energy consumption data and the preset model loss function, model training based on the machine learning algorithm to obtain the energy consumption prediction model.

4. The method according to claim 3, wherein obtaining the historical driving data of the electric vehicle comprises:
 obtaining historical raw driving data of the electric vehicle; and
 pre-processing the historical raw driving data to obtain the historical driving data of the electric vehicle.

5. The method according to claim 3, wherein calculating historical energy consumption data per unit time of the electric vehicle based on the historical charge and discharge data and the rated battery capacity comprises:
 obtaining historical charge data and historical discharge data of the electric vehicle based on the historical charge and discharge data by taking a set time as a cycle;
 obtaining a battery state of health of the electric vehicle within the set time based on the historical charge data and the rated battery capacity; and
 obtaining the historical energy consumption data per unit time of the electric vehicle according to the battery state of health, the rated battery capacity, and historical discharge data corresponding to the historical charge data.

6. The method according to claim 5, wherein one charge section corresponds to a plurality of sub-discharge sections within the set time; and obtaining the historical energy consumption data per unit time of the electric vehicle according to the battery state of health, the rated battery capacity, and historical discharge data corresponding to the historical charge data comprises:
 obtaining the historical energy consumption data per unit time of the electric vehicle according to the battery state of health, the rated battery capacity, and historical discharge data of the sub-discharge sections.

7. The method according to claim 5, wherein a plurality of charge sections exist within the set time; and obtaining the historical energy consumption data per unit time of the electric vehicle according to the battery state of health, the rated battery capacity, and historical discharge data corresponding to the historical charge data comprises:
 obtaining the historical energy consumption data per unit time of the electric vehicle according to the battery state of health, the rated battery capacity, historical charge data of the charge sections, and historical discharge data of discharge sections corresponding to the charge sections.

8. The method according to claim 7, wherein obtaining the historical energy consumption data per unit time of the electric vehicle according to the battery state of health, the rated battery capacity, historical charge data of the charge sections, and historical discharge data of discharge sections corresponding to the charge sections comprises:
 obtaining energy consumption of the discharge sections corresponding to the charge sections according to the battery state of health, the rated battery capacity, the historical charge data of the charge sections, and the historical discharge data of the discharge sections corresponding to the charge sections;
 calculating, if a maximum energy consumption value in the energy consumption of the discharge sections corresponding to the charge sections is less than the rated battery capacity, historical energy consumption data per unit time within the set time according to the maximum energy consumption value; or
 calculating, if the maximum energy consumption value in the energy consumption of the discharge sections corresponding to the charge sections is greater than or equal to the rated battery capacity and less than a preset multiple of the rated battery capacity, the historical energy consumption data per unit time within the set time according to an average value of the energy consumption of the discharge sections corresponding to the charge sections; and
 discarding, if the maximum energy consumption value in the energy consumption of the discharge sections corresponding to the charge sections is greater than or equal to the preset multiple of the rated battery capacity, the historical charge and discharge data within the corresponding set time.

9. The method according to claim 3, wherein, after inputting the discharge duration data and the driving position characteristic data into the energy consumption prediction model to obtain energy consumption prediction data of the electric vehicle, the method further comprises:
 dividing the historical energy consumption data into a training set and a test set, and obtaining energy consumption prediction data corresponding to the test set based on the training set and the energy consumption prediction model; and
 correcting the energy consumption prediction data according to the test set and the energy consumption prediction data corresponding to the test set, to obtain corrected energy consumption prediction data.

10. The method according to claim 1, wherein inputting the discharge duration data and the driving position characteristic data into the energy consumption prediction model to obtain energy consumption prediction data of the electric vehicle comprises:
 interpolating the discharge duration data to obtain interpolated discharge duration data, and inputting the interpolated discharge duration data and the driving position characteristic data into the energy consumption prediction model.

11. The method according to claim 1, wherein inputting the discharge duration data and the driving position characteristic data into the energy consumption prediction model to obtain energy consumption prediction data of the electric vehicle comprises:
 inputting the discharge duration data and the driving position characteristic data into the energy consumption prediction model to obtain initial energy consumption prediction data of the electric vehicle; and dividing the initial energy consumption prediction data into groups according to the preset time, and taking preset centiles of the groups as energy consumption prediction data within the corresponding preset time;

wherein the preset centiles are greater than 50%.

12. The method according to claim 1, wherein after inputting the discharge duration data and the driving position characteristic data into the energy consumption prediction model to obtain energy consumption prediction data of the electric vehicle, the method further comprises:

obtaining a battery state of health estimated value of the electric vehicle; and determining a breakdown risk of the electric vehicle according to the battery state of health estimated value and the energy consumption prediction data.

13. An apparatus for predicting electric vehicle energy consumption, comprising:

a discharge duration acquisition module configured to obtain discharge duration data of a electric vehicle;

a driving position characteristic acquisition module configured to obtain driving position characteristic data of the electric vehicle; and an energy consumption prediction module configured to input the discharge duration data and the driving position characteristic data into an energy consumption prediction model to obtain energy consumption prediction data of the electric vehicle;

wherein the energy consumption prediction model is obtained based on a machine learning algorithm.

14. The apparatus according to claim 13, wherein the apparatus further comprises:

an energy consumption prediction model training module configured to perform, according to historical driving data and rated battery capacity of the electric vehicle and a preset model loss function, model training based on the machine learning algorithm to obtain the energy consumption prediction model.

15. The apparatus according to claim 14, wherein the energy consumption prediction model training module comprises:

a data acquisition unit configured to obtain the historical driving data and the rated battery capacity of the electric vehicle, wherein the historical driving data comprises historical charge and discharge data and historical driving position characteristic data;

an energy consumption data calculation unit configured to calculate historical energy consumption data per unit time of the electric vehicle based on the historical charge and discharge data and the rated battery capacity;

a historical energy consumption data generation unit configured to obtain historical energy consumption data according to the historical energy consumption data per unit time and the historical driving position characteristic data; and an energy consumption prediction model training unit configured to perform, according to the historical energy consumption data and the preset model loss function, model training based on the machine learning algorithm to obtain the energy consumption prediction model.

16. The apparatus according to claim 13, wherein the apparatus further comprises a correction module configured to:

divide the historical energy consumption data into a training set and a test set, and obtain energy consumption prediction data corresponding to the test set based on the training set and the energy consumption prediction model; and correct the energy consumption prediction data according to the test set and the energy consumption prediction data corresponding to the test set, to obtain corrected energy consumption prediction data.

17. The apparatus according to claim 13, wherein the apparatus further comprises a breakdown risk determination module configured to:

obtain a battery state of health estimated value of the electric vehicle; and determine a breakdown risk of the electric vehicle according to the battery state of health estimated value and the energy consumption prediction data.

18. A computer device, comprising a memory and one or more processors, the memory storing computer-readable instructions which, when executed by the one or more processors, cause the one or more processors to perform the following steps:

obtaining discharge duration data of an electric vehicle;

obtaining driving position characteristic data of the electric vehicle; and inputting the discharge duration data and the driving position characteristic data into an energy consumption prediction model to obtain energy consumption prediction data of the electric vehicle;

wherein the energy consumption prediction model is obtained based on a machine learning algorithm.

* * * * *